US008390907B2

(12) United States Patent
 Shibusawa

(10) Patent No.: US 8,390,907 B2
(45) Date of Patent: Mar. 5, 2013

(54) IMAGE-PROCESSING DEVICE, IMAGE-FORMING DEVICE, IMAGE-PROCESSING METHOD, AND COMPUTER READABLE MEDIUM

(75) Inventor: Toshihiko Shibusawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 776 days.

(21) Appl. No.: 12/563,177

(22) Filed: Sep. 21, 2009

(65) Prior Publication Data

US 2010/0245861 A1   Sep. 30, 2010

(30) Foreign Application Priority Data

Mar. 25, 2009   (JP) ................................ 2009-075175

(51) Int. Cl.
 *G03F 3/08* (2006.01)
 *G06K 15/00* (2006.01)
 *G06K 9/00* (2006.01)
 *H04N 1/60* (2006.01)
(52) U.S. Cl. ......... 358/518; 358/2.99; 358/1.9; 382/167
(58) Field of Classification Search ................... 358/1.9, 358/518, 1.2, 3.01, 2.99, 1.15; 382/167, 382/165, 164
 See application file for complete search history.

(56) References Cited

U.S. PATENT DOCUMENTS

| 5,956,468 | A  | * | 9/1999 | Ancin ............................ 358/1.9 |
| 6,035,059 | A  | * | 3/2000 | Kurosawa et al. ............ 382/164 |
| 6,989,839 | B2 | * | 1/2006 | Braun et al. .................. 345/591 |
| 7,027,660 | B2 | * | 4/2006 | Hersch et al. ................. 382/257 |
| 2003/0128379 | A1 | * | 7/2003 | Inoue ............................ 358/1.9 |
| 2008/0007785 | A1 | * | 1/2008 | Hashii et al. ................. 358/3.01 |

FOREIGN PATENT DOCUMENTS

| JP | 10-151830 A | 6/1998 |
| JP | 2004-078325 A | 3/2004 |
| JP | 2004-080118 A | 3/2004 |
| JP | 2007-226448 A | 9/2007 |

OTHER PUBLICATIONS

Japanese Office Action for Japanese patent application No. 2009-075175 dated Nov. 30, 2010 and English-language translation.

* cited by examiner

*Primary Examiner* — Madelein A Nguyen
(74) *Attorney, Agent, or Firm* — Sughrue Mion, PLLC

(57) ABSTRACT

An image-processing device includes: a memory that stores a color range within a color space; an acquisition unit that acquires image data; and a generating unit that generates image data in which an image represented by the image data acquired by the acquisition unit has been subjected to an operation to change a color of an image area of the image having a color falling within the color range into black, and an operation to add a black image beside the image area.

12 Claims, 5 Drawing Sheets

FIG. 6

PRINT SETTINGS

ADVANCED SETTINGS

COLOR MODE(M)
BLACK-AND-WHITE PRINT ▶

☐ FUZZY JUDGMENT BY AUTOMATIC MODE(J)

PRINT MODE(F)
NORMAL ▶

☐ SAVING TONER(T)
COLOR UNIVERSAL PRINT(U)
UNDERLINE RED CHARACTER ▶

SETTING CHANGE(E)
NORMAL ▶

RECOMMENDED QUALITY TYPE(C)
NORMAL | PICTURE

AUTOMATIC CORRECTION OF PICTURE QUALITY(N)
UNNECESSARY ▶

OK    CANCEL

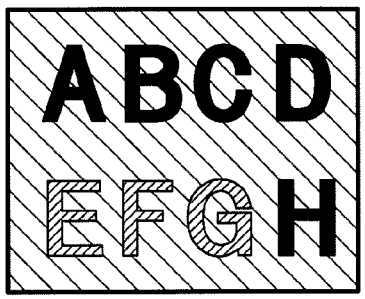
FIG. 7A
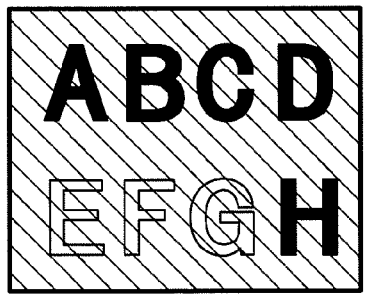
FIG. 7B
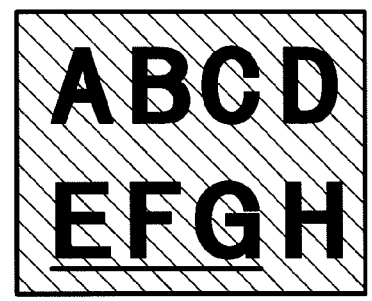
FIG. 7C
FIG. 8A
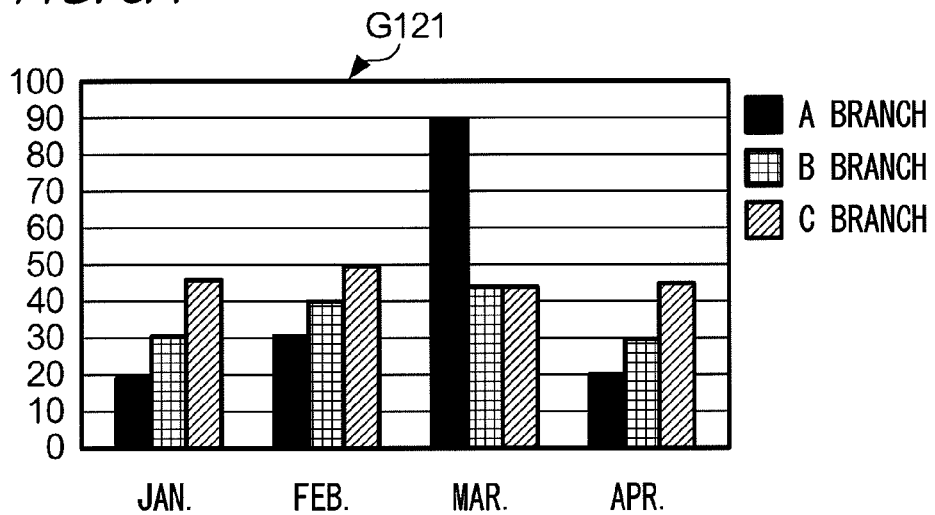
FIG. 8B
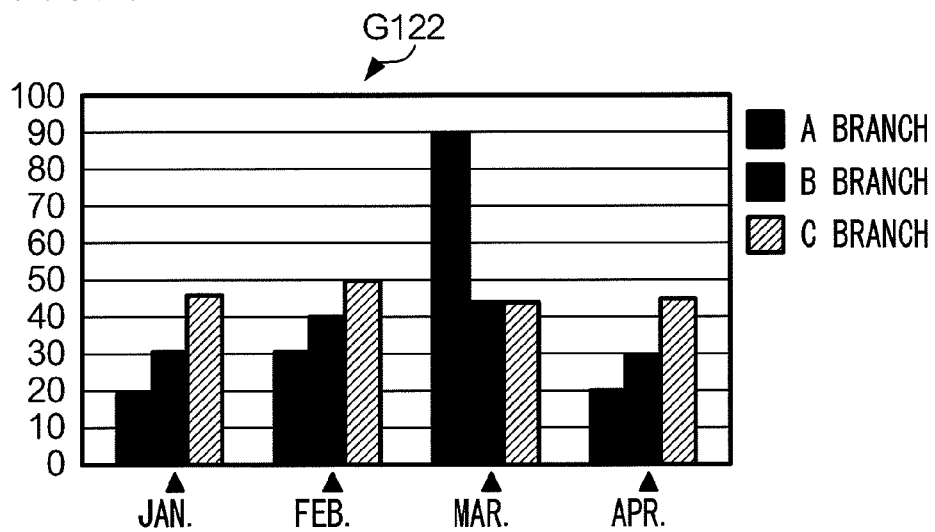

ions of

IMAGE-PROCESSING DEVICE, IMAGE-FORMING DEVICE, IMAGE-PROCESSING METHOD, AND COMPUTER READABLE MEDIUM

CROSS-REFERENCE TO RELATED APPLICATIONS

This application is based on and claims priority under 35 USC 119 from Japanese Patent Application No. 2009-075175 filed on Mar. 25, 2009.

BACKGROUND

1. Technical Field

The present invention relates to an image-processing device, an image-forming device, an image-processing method, and a computer readable medium.

2. Related Art

Coloring of a character string in a document using a color other than black is a commonly used technique for highlighting the character string. However, if a document including a character string thus colored is printed in black and white, the character string colored is represented in gray; accordingly, visibility of the character string is reduced.

SUMMARY

An aspect of the present invention provides an image-processing device including: a memory that stores a color range of a color within a color space; an acquisition unit that acquires image data; and a generating unit that generates image data in which an image represented by the image data acquired by the acquisition unit has been subjected to an operation to change a color of an image area of the image having a color falling within the color range into black, and an operation to add a black image around the image area.

BRIEF DESCRIPTION OF THE DRAWINGS

Exemplary embodiments of the present invention will be described in detail below with reference to the following figures, wherein:

FIG. 6 is a diagram showing dialogue box 5;

FIGS. 7A to 7C are diagrams showing an image of a character string; and

FIGS. 8A and 8B are diagrams showing an image of a bar graph.

DETAILED DESCRIPTION

(1) Configuration

Figure 1:
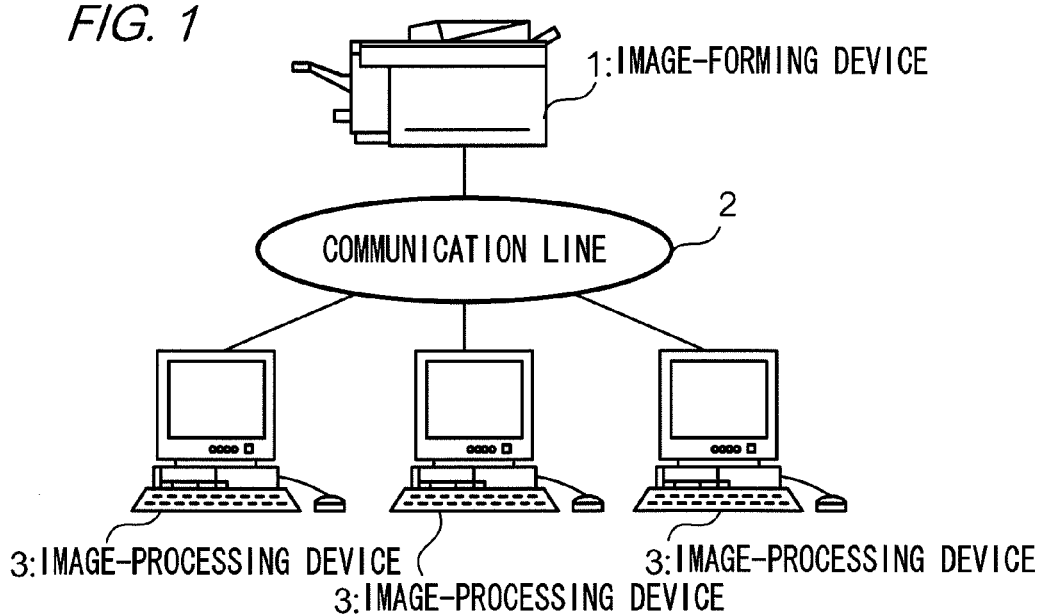
FIG. 1 is a diagram showing an entire configuration of a system according to an exemplary embodiment of the present invention.

FIG. 1 is a diagram showing an entire configuration of a system according to the present exemplary embodiment.

Image-forming device 1 and image-processing devices 3 are connected with each other via communication line 2, which is, for example, a LAN (Local Area Network). Image-forming device 1 has functions of copying, image forming, and image reading. Image-processing devices 3 may be personal computers, which have a function of image processing. Image-processing devices 3 also have a function of providing image-forming device 1 with image data via communication line 2, and providing image-forming device 1 with an instruction to form an image on the basis of the image data. Although FIG. 1 shows a single image-forming device 1 and three image-processing devices 3, there may be a different number of image-forming devices 1 and image-processing devices 3 connected to communication line 2.

Figure 2:
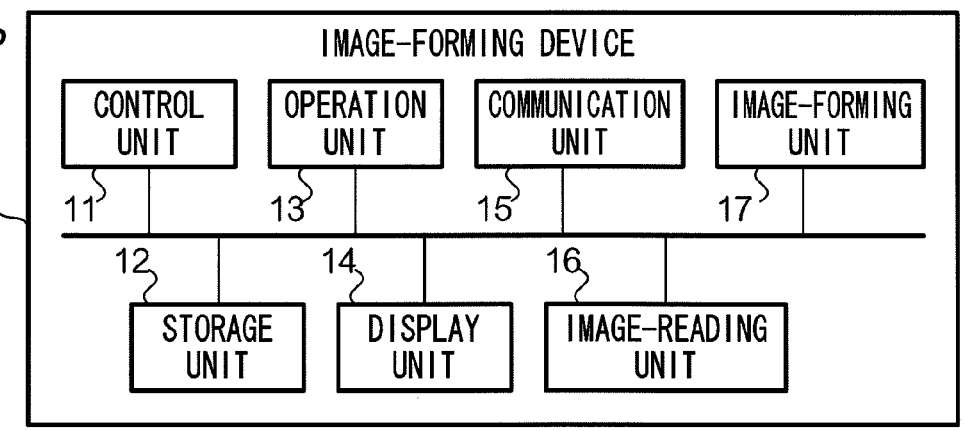
FIG. 2 is a block diagram showing a configuration of image-forming device 1.

FIG. 2 is a block diagram showing a configuration of image-forming device 1.

Image-forming device 1 includes control unit 11, memory 12, operation unit 13, display unit 14, communication unit 15, image-reading unit 16, and image-forming unit 17. Control unit 11 includes a CPU (Central Processing Unit), a ROM (Read Only Memory), and a RAM (Random Access Memory). The CPU executes a program stored in the ROM or memory 12 to control components of image-forming device 1. Memory 12 is a nonvolatile auxiliary storage device such as an HDD (Hard Disk Drive), which stores programs and data. Operation unit 13 includes plural keys, and in response to an operation by a user, outputs a signal corresponding to the operation to control unit 11. Display unit 14 includes a liquid crystal display and a liquid crystal driving circuit, and displays information on progress of a processing or guidance about an operation, on the basis of data provided from control unit 11. Communication unit 15 includes a communication interface, and communicates with image-processing device 3 via communication line 2.

Image-reading unit 16 includes an image pickup device such as a CCD (Charge Coupled Device), and causes the image pickup device to read an image formed on a recording sheet to generate image data representing the read image. Image-forming unit 17 includes a photosensitive drum for holding an image, an exposure unit that exposes the photosensitive drum on the basis of image data to form an electrostatic latent image on the drum, a developing unit that develops an electrostatic latent image to form a toner image, a transfer unit that transfers a toner image to a recording sheet, and a fixing unit that fixes a toner image transferred to a recording sheet, on the recording sheet. Image-forming unit 17 forms an image represented by image data generated by image-reading unit 16, or an image represented by image data received via communication unit 15, on a recording sheet. Namely, image-forming unit 17 forms an image represented by image data generated by an image-forming device, on a recording medium such as a recording sheet.

Figure 3:
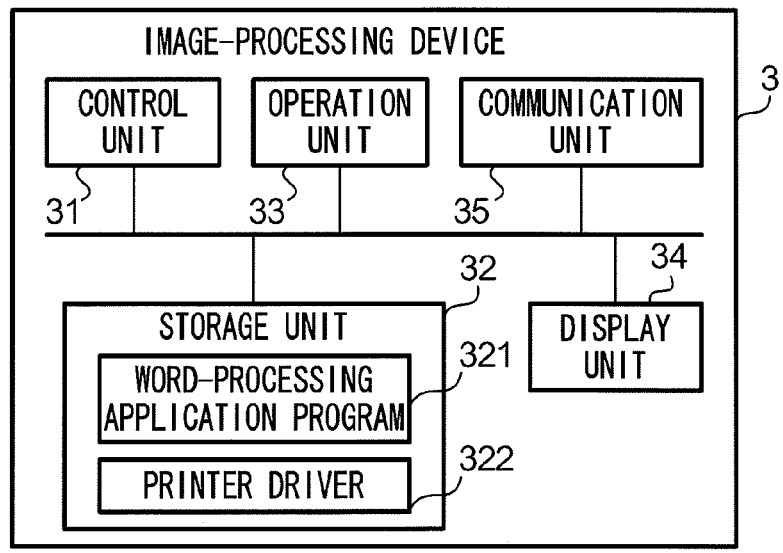
FIG. 3 is a block diagram showing a configuration of image-processing device 3.

FIG. 3 is a block diagram showing a configuration of image-processing device 3.

Image-processing device 3 includes control unit 31, memory 32, operation unit 33, display unit 34, and communication unit 35. Control unit 31 includes a CPU (Central Processing Unit), a ROM (Read Only Memory), and a RAM (Random Access Memory). The CPU executes a program stored in the ROM and memory 32 to control components of image-processing device 3. Operation unit 33 includes a keyboard and a mouse, and in response to an operation by a user, provides control unit 31 with a signal corresponding to the operation. Display unit 34 may be a CRT (Cathode Ray Tube) or a liquid crystal display. Display unit 34 displays information on the basis of image data provided from control unit 31. Communication unit 35 includes a communication circuit and a communication interface, which communicates with image-forming device 1 via communication line 2.

Memory 32 is a nonvolatile auxiliary storage device such as an HDD (Hard Disk Drive), which stores programs and data. Memory 32 stores word-processing application program 321. Control unit 31, by following a procedure described in word processing application program 321, generates image data representing a document in which characters, graphics, and/or tables are arranged, in the RAM. Control unit 31 is an example of an acquisition unit that acquires image data.

Memory 32 also stores printer driver 322. Control unit 31, by following a procedure described in printer driver 322, converts image data generated using word-processing application program 321 into image data described in a page description language that can be interpreted by image-forming device 1. Printer driver 322 describes a red range within an RGB color space. In the present exemplary embodiment, each color of RGB is represented in 256 shades, and a red range is represented as follows: R=255, G=0 to 51, and B=0 to 51. Memory 32 is an example of a color memory that stores a range of a particular color within a color space.

Printer driver 322 also describes a procedure of an operation carried out by control unit 31 on image data generated using word-processing application program 321. Control unit 31 carries out an operation on an image represented by prepared image data, to change a color of an area of the image having a red color to black (hereinafter referred to as "color changing operation"), and to add a black image around the area (hereinafter referred to as "effect adding operation"), thereby generating image data representing an image subjected to a color changing operation and an effect addition operation.

(2) Operation

Figure 4A:
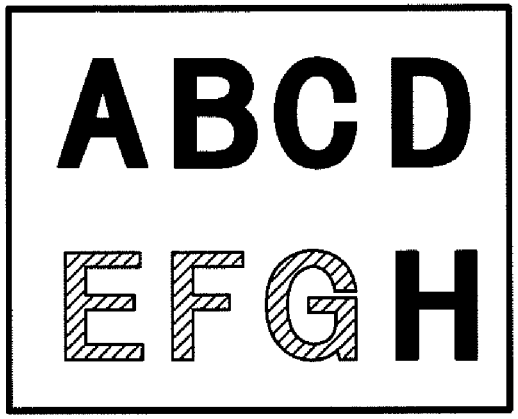
FIGS. 4A to 4E are diagrams showing an image of a character string.

A user causes image-processing device 3 to execute word-processing application program 321, and while viewing an image displayed on display unit 34, prepares a document using operation unit 33. If there is a character to be emphasized in the document, the user provides image-processing unit 3 with an instruction to change the color of the character to red, using operation unit 33. FIG. 4A shows an example of a prepared document. In the document, among eight characters A to H, three characters E, F, and G are represented in red, and the other characters are represented in black. Control unit 31, by following a procedure described in word-processing application program 321, generates image data corresponding to an operation by the user in a RAM.

Printer driver 322 has a function of specifying whether to perform a color changing operation and an effect adding operation. FIG. 6 is a diagram showing dialogue box 5 for specifying whether to perform a color changing operation and an effect adding operation. Dialogue box 5 is displayed when a menu of a window, which displays a document in preparation using word-processing application program 321, is manipulated. In list box "color mode" of dialogue box 5, a user is able to specify either a "color print" or a "black-and-white print." In list box "color universal print," a user is able to specify one of four items: "not use," "hatch red character (lightly)," "hatch red character (densely)," and "underline red character." If a "black-and-white print" is specified, and one of "hatch red character (lightly)," "hatch red character (densely)," and "underline red character" is specified, a color changing operation and an effect adding operation are carried out. If an item "hatch red character (lightly)" is specified, low-density hatching is performed as an effect adding operation, if an item "hatch red character (densely)" is specified, high-density hatching is performed, and if an item "underline red character" is specified, an underline is added. In the present description, it is assumed that a "black-and-white print" and an item "underline red character" are specified.

Figure 5:
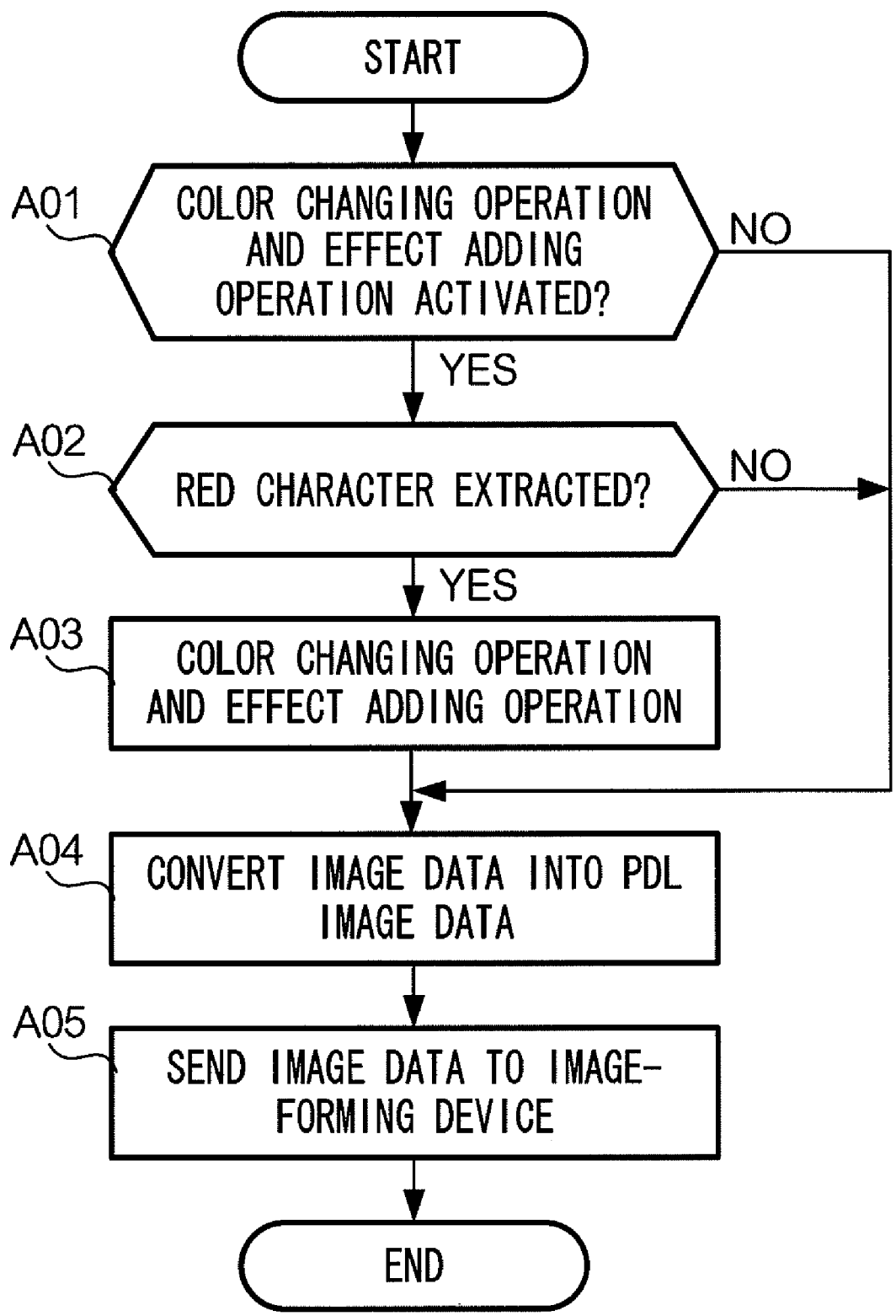
FIG. 5 is a flowchart showing an operation carried out by control unit 31.

After image data is prepared in the RAM, if an instruction to print the prepared document is given, control unit 31 executes printer driver 322 to start an operation shown in FIG. 5.

Control unit 31 initially determines whether printer driver 322 is configured to perform a color changing operation and an effect adding operation (step A01). If printer driver 322 is configured to carry out the operations, control unit 31 proceeds to an operation of step A02, and if printer driver 322 is not configured to carry out the operations, control unit 31 proceeds to an operation of step A04. In the present description, it is assumed that a "black-and-white print" and an item "underline red character" are specified, as described above, control unit 31 proceeds to an operation of step A02.

At step A02, control unit 31 extracts a red character in an image represented by the image data. The image data may describe character information specifying faces and sizes of characters shown in FIG. 4A and color information (gray levels of R, G and B) specifying colors of the characters in association with each other. Control unit 31, by comparing the color information and a red range described in printer driver 322, extracts a red character. If a red character is extracted (step A02: YES), control unit 31 proceeds to an operation of step A03. If a red character is not extracted (step A02: NO), control unit 31 proceeds to step A04.

Figure 4B:
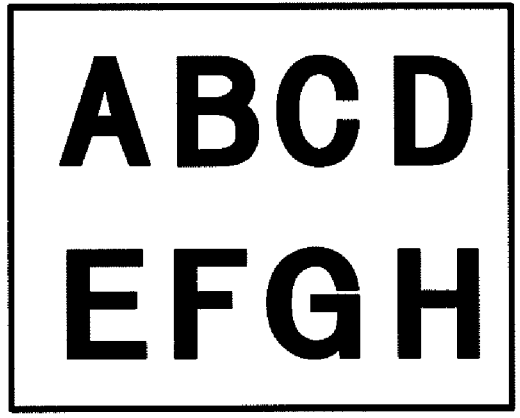

At step A03, control unit 31 carries out a color changing operation to change the color of the red character extracted at step A02 to black. Specifically, control unit 31 changes color information included in the image data so that color information associated with the red character is changed to color information representing a black color, (R=0, G=0, B=0). FIG. 4B is a diagram showing an image subjected to a color changing operation. In the shown image, the color of three characters, E, F, and G, has been changed to black, which is the same color as that of the other characters.

Figure 4C:

Subsequently, control unit 31 carries out an effect adding operation to add a black image around the character whose color has been changed to black. Specifically, control unit 31 adds, in the image data, data representing a black hatching image, in association with characters E, F, and G. FIG. 4C is a diagram showing an image subjected to an effect adding operation. In the shown image, an image representing a black hatching has been added to characters E, F, and G.

Control unit 31 is an example of a generating unit that generates image data in which an image represented by image data acquired by an acquisition unit has been subjected to an operation to change a color of an area of the image having a color falling within a range of a certain color, and an operation to add a black image to the area.

After the effect adding operation is completed, control unit 31 proceeds to an operation of step A04.

At step A04, control unit 31 converts the image data into image data described in a page description language. At step A05, control unit 31 sends the image data and an instruction to form an image on the basis of the image data to image-forming device 1 via communication line 2.

When the image data and the instruction sent from image-processing device 3 is received by communication unit 15 of image-forming device 1, control unit 11 of image-forming device 1 converts the image data into bit-mapped image data, binarizes the bit-mapped image data, and provides image-forming unit 17 with the binarized image data. Image-forming unit 17 forms an image represented by the provided image data on a recording sheet, using a black toner.

Now, an effect of the present exemplary embodiment will be described.

As a method of binarizing bit-mapped image data in image-processing device 3, a variety of methods are known. In the present exemplary embodiment, any method may be employed to binarize bit-mapped image data; however, in the following description, it is assumed that an ordered dither method is employed. If an ordered dither method is employed, control unit 11 obtains brightness values of pixels represented by bit-mapped image data on the basis of color information of the pixels. Control unit 11 compares the brightness values and threshold values of a predetermined threshold matrix. Control unit 11 changes color information of pixels, whose brightness value is equal to or larger than a threshold value, to color information representing a white color, (R=255, G=255, B=255), and changes color information of pixels, whose brightness value is smaller than a threshold value, to color information representing a black color (R=0, G=0, B=0).

If the binarization is performed on an image including a black character string and a red character string, the color of the black character string does not change before and after the binarization; however, the color of the red character subjected to the binarization is to be recognized as gray by a user. Namely, visibility of the red character is reduced to a level lower than that of the black character. Accordingly, an effect of highlighting using a red color can hardly be obtained. In addition, an effect such as an underline or hatching, if applied to a red character during preparation of a document to further highlight the character, is colored with red. Accordingly, the color of the effect subjected to a binarization is similarly to be recognized as gray by a user, and an effect of highlighting can hardly be obtained. Also, since hatching is a dot pattern, and a part of a dot pattern subjected to a binarization disappears, an effect of hatching can hardly be obtained.

In contrast, in the present exemplary embodiment, the color of three characters E, F, and G is changed from red to black using a color changing operation, and black hatching is added to the three characters using an effect adding operation. Specifically, color information of pixels corresponding to three characters E, F, and G is changed to color information representing a black color, (R=0, G=0, B=0), and hatching of pixels having color information representing a black color (R=0, G=0, B=0) is added to the three characters. If an image subjected to the two operations is further subjected to the above-mentioned binarization, the image is output while color information of pixels corresponding to three characters E, F, and G, and hatching, are not changed. If an image represented by binarized image data is formed on a recording sheet by image-forming device 1, three characters E, F, and G are represented as black characters as the other characters are, and hatching added to the three characters does not disappear, as shown in FIG. 4C.

In another case, if a black character string and a red character string are arranged against a blue background in a document, as shown in FIG. 7A, the brightness level of the blue color and the brightness level of the red color being equivalent, and the document is subjected to black-and-white printing of a conventional image-forming device, the color of the background and the color of the red character string will be recognized as a gray color having an identical density by a user, as shown in FIG. 7B. Accordingly, the red character string is difficult to recognize. However, according to the present exemplary embodiment, since the color of a red character string is changed to black, as shown in FIG. 7C, the color of a background will be recognized as gray, and the color of the character string will be recognized as black. Accordingly, the character string can be recognized.

(3) Modifications

Modifications described below may be combined with each other.

(Modification 1)

In the above exemplary embodiment, a red range is stored in memory 32, and the color of an area having a color falling within the range is changed to black. In the exemplary embodiment, a range of any color may be stored in memory 32. For example, if a document is subjected to black-and-white printing, in which a certain character string is colored with blue, a blue range may be stored in memory 32 to change the color of the character string to black, and add a black image to the character string. Namely, a range of a color stored in memory 32 may be determined on the basis of the color of a character string represented by a color other than black in a document to be printed in black and white.

In another case, a person having color weakness has difficulty in recognizing a range of a given color. Such a person may not be able to realize a difference in color between a character represented in a certain range of a color other than black and a character represented in black. Accordingly, if a document is provided to a person having color weakness, a range of a color that is difficult to recognize for the person may be stored in memory 32, and thereafter a document may be printed in black and white. It is to be noted that although color weakness is classified into several types on the basis of a range of a color that is difficult to recognize, it is said that a rate of persons having difficulty in recognizing a red color is relatively high. Also, when a character string is represented in a color other than black to highlight it, a red color is commonly used. Accordingly, storing a red range in memory 32 is preferable.

(Modification 2)

Figure 4D:

In the above exemplary embodiment, where an image of hatching is added to a character string to be highlighted, other images may be added to a character string. For example, an underline is added to a character string, as shown in FIG. 4D.

(Modification 3)

In the above exemplary embodiment, where a color changing operation and an effect adding operation are applied to a character string, the operations may be applied to an image such as a graphic or a table. FIGS. 8A and 8B are diagrams showing an example of applying a color changing operation and an effect adding operation to a bar chart. Bar chart G121 shown in FIG. 8A is a pre-processed chart. In the chart, bars corresponding to A branch are represented in black, bars corresponding to B branch are represented in red, and bars corresponding to C branch are represented in green. In contrast, in bar chart G122 of FIG. 8B, which shows a processed chart; since the color of a red area is changed to black, bars corresponding to A branch and bars corresponding to B branch are represented in black, and bars corresponding to C branch are represented in gray. Also, black triangular symbols are shown below the bars corresponding to B branch.

(Modification 4)

In the above exemplary embodiment, the order of operations at step A03, a color changing operation and an effect adding operation, may be changed. Specifically, control unit 31 may initially add a black image to a red character extracted at step A02, and subsequently change the color of the character string to black. An image obtained in accordance with the present modification and an image obtained in accordance with the above exemplary embodiment are identical.

(Modification 5)

Figure 4E:

In the above exemplary embodiment, where a black image is added to apply an effect to an area of an image having a color falling within a range of a particular color, an operation to change the shape of the area may be instead carried out. Specifically, control unit 31 may, instead of an effect adding operation carried out at step A03 of the above exemplary embodiment, apply a shape changing operation to a character string whose color has been changed to black by a color changing operation, to change the shape of the character string. For example, control unit 31 may change the face of a character string to an italic face, as shown in FIG. 4E.

It is to be noted that the order of a color changing operation and a shape changing operation may be changed.

Control unit 31 is an example of a generating unit that generates image data in which an image represented by image data acquired by an acquisition unit has been subjected to an operation to change a color of an area of the image having a color falling within a range of a certain color, and an operation to change a shape of the area.

(Modification 6)

In the above exemplary embodiment where control unit 31 of image-processing device 3 carries out a color changing operation and an effect adding operation by executing printer driver 322, a program describing a procedure of the operation may be stored in memory 12 of image-forming device 1, and the operation may be carried out by control unit 11. If this configuration is employed, a color changing operation and an effect adding operation may be applied to an image represented by image data representing an image read by image-reading unit 16. Accordingly, an image subjected to a color changing operation and an effect adding operation may be obtained even in a case where an image formed on a recording sheet is copied in black and white.

Also, an ASIC (Application Specific Integrated Circuit) for carrying out a color changing operation and an effect adding operation may be provided in image-processing device 3.

(Modification 7)

In the above exemplary embodiments where a range of a particular color is represented by gray levels of an RGB color space, a range of a particular color may be represented in a color space such as an HLS color space representing a color in hue, saturation, and lightness.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-processing device comprising:
    a memory that stores a color range within a color space;
    an acquisition unit that acquires a first image data;
    a first specifying unit that specifies whether to perform black-and-white printing;
    a second specifying unit that specifies whether to perform an effect adding operation to add an effect to an image area of an image having a color falling within the color range; and
    a generating unit that when the first specifying unit specifies to perform black-and-white printing and the second specifying unit specifies to perform the effect adding operation, generates a second image data in which an image represented by the first image data acquired by the acquisition unit has been subjected to a binarization operation after a first operation to change a color of the image area of the image having a color falling within the color range into black and a second operation to add a black image around the image area.

2. The image-processing device according to claim 1, wherein the memory stores a red color range within a color space.

3. An image-processing device comprising:
    a memory that stores a color range within a color space;
    an acquisition unit that acquires a first image data;
    a first specifying unit that specifies whether to perform black-and-white printing;
    a second specifying unit that specifies whether to perform an effect adding operation to add an effect to an image area of an image having a color falling within the color range; and
    a generating unit that when the first specifying unit specifies to perform black-and-white printing and the second specifying unit specifies to perform the effect adding operation, generates a second image data in which an image represented by the first image data acquired by the acquisition unit has been subjected to a binarization operation after a first operation to change a color of the image area of the image having a color falling within the color range into black and a second operation to change a shape of the image area.

4. The image-processing device according to claim 3, wherein the memory stores a red color range within a color space.

5. An image-forming device comprising:
    the image-processing device according to claim 1; and
    an image-forming unit that forms an image on a recording sheet using a black material, represented by image data generated by the image-processing device.

6. An image-forming device comprising:
    the image-processing device according to claim 3; and
    an image-forming unit that forms an image on a recording sheet using a black material, represented by image data generated by the image-processing device.

7. An image-forming device comprising:
    the image-processing device according to claim 2; and
    an image-forming unit that forms an image on a recording sheet using a black material, represented by image data generated by the image-processing device.

8. An image-forming device comprising:
    the image-processing device according to claim 4; and
    an image-forming unit that forms an image on a recording sheet using a black material, represented by image data generated by the image-processing device.

9. An image-processing method comprising:
    acquiring a first image data;
    specifying whether to perform black-and-white printing;
    specifying whether to perform an effect adding operation to add an effect to an image area of an image having a color falling within a predetermined color rang a color space and when black-and-white printing and the effect adding operation are specified to be performed, generating a second image data in which an image represented by the acquired first image data has been subjected to a binarization operation after a first operation to change a color of the image area of the image having a color falling within the color range into black and a second operation to add a black image around the image area.

10. An image-processing method comprising:

acquiring a first image data;

specifying whether to perform black-and-white printing;

specifying whether to perform an effect adding operation to add an effect to an image area of an image having a color falling within a predetermined color range within a color space; and when black-and-white printing and the effect adding operation are specified to be performed, generating a second image data in which an image represented by the acquired first image data has been subjected to a binarization operation after a first operation to change a color of the image area of the image having a color falling within the color range into black and a second operation to change a shape of the image area.

11. A non-transitory computer readable medium storing a program causing a computer to execute a process for image-processing, the computer comprising a memory that stores a color range within a color space, the process comprising:

acquiring a first image data;

specifying whether to perform black-and-white printing;

specifying whether to perform an effect adding operation to add an effect to an image area of an image having a color falling within the color range; and when black-and-white printing and the effect adding operation are specified to be performed, generating a second image data in which an image represented by the acquired first image data has been subjected to a binarization operation after first operation to change a color of the image area of the image having a color falling within the color range into black and a second operation to add a black image around the image area.

12. A non-transitory computer readable medium storing a program causing a computer to execute a process for image-processing, the computer comprising a memory that stores a color range within a color space, the process comprising:

acquiring a first image data;

specifying whether to perform black-and-white printing;

specifying whether to perform an effect adding operation to add an effect to an image area of an image having a color falling within the color range; and when black-and-white printing and the effect adding operation are specified to be performed, generating a second image data in which an image represented by the acquired first image data has been subjected to a binarization operation after a first operation to change a color of the image area of the image having a color falling within the color range into black and a second operation to change a shape of the image area.

* * * * *